(12) United States Patent
Carlson et al.

(10) Patent No.: US 10,377,091 B2
(45) Date of Patent: Aug. 13, 2019

(54) METHODS FOR FORMING A COMPOSITE BLADE STIFFENER AND FACILITATING APPLICATION OF BARELY VISIBLE IMPACT DAMAGE TREATMENTS

(71) Applicant: The Boeing Company, Chicago, IL (US)

(72) Inventors: Lisa Carlson, Chicago, IL (US); Kanna M. Pham, Renton, WA (US); Joseph Sweetin, Chicago, IL (US); Garrett C. Hanson, Mukilteo, WA (US); Jake Adam Reeves, Seattle, WA (US); Chilip Chan, Seattle, WA (US); Kiet Nguyen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 455 days.

(21) Appl. No.: 15/340,568

(22) Filed: Nov. 1, 2016

(65) Prior Publication Data

US 2018/0117859 A1    May 3, 2018

(51) Int. Cl.
*B29C 53/04*    (2006.01)
*B29C 70/54*    (2006.01)
(Continued)

(52) U.S. Cl.
CPC ............ *B29C 70/34* (2013.01); *B29C 33/68* (2013.01); *B29C 53/04* (2013.01); *B29C 70/20* (2013.01); *B29C 70/22* (2013.01); *B29C 70/46* (2013.01); *B29C 70/545* (2013.01); *B29D 99/0003* (2013.01); *B64C 3/18* (2013.01); *B29D 99/0014* (2013.01); *B29K 2061/04* (2013.01); *B29K 2063/00* (2013.01); *B29K 2105/256* (2013.01); *B29K 2307/04* (2013.01); *B29L 2031/082* (2013.01); *B64C 1/064* (2013.01); *B64C 3/182* (2013.01); *Y10T 156/1044* (2015.01); *Y10T 156/1049* (2015.01); *Y10T 156/1051* (2015.01)

(58) Field of Classification Search
None
See application file for complete search history.

(56) References Cited

U.S. PATENT DOCUMENTS 8,465,613 B2    6/2013   Rotter et al.
2009/0297358 A1*  12/2009  Anderson ............. B29C 43/021
                                                        416/241 A
(Continued)

*Primary Examiner* — Barbara J Musser
(74) *Attorney, Agent, or Firm* — McDonnell Boehnen Hulbert & Berghoff LLP

(57) ABSTRACT

An example method for forming a flat composite charge into a composite blade stiffener includes cutting a flat composite charge along a cut line into a first piece and a second piece having an angle, positioning the first piece and the second piece of the flat composite charge on a forming mandrel about a tooling plunger, activating the tooling plunger to drive the first piece and the second piece into a cavity of the forming mandrel resulting in the first piece and the second piece folding at the cut line, withdrawing the tooling plunger from the cavity of the forming mandrel, compressing the forming mandrel to apply a lateral pressure to the first piece and the second piece folded into the cavity, and applying a vertical pressure to a first flange and a second flange of the first piece and the second piece, respectively, to form the composite blade stiffener.

20 Claims, 12 Drawing Sheets

(51) Int. Cl.
  *B29C 70/34*  (2006.01)
  *B64C 3/18*  (2006.01)
  *B29C 33/68*  (2006.01)
  *B29C 70/20*  (2006.01)
  *B29C 70/22*  (2006.01)
  *B29C 70/46*  (2006.01)
  *B29D 99/00*  (2010.01)
  *B64C 1/06*  (2006.01)
  *B29K 61/04*  (2006.01)
  *B29K 63/00*  (2006.01)
  *B29K 105/00*  (2006.01)
  *B29K 307/04*  (2006.01)
  *B29L 31/08*  (2006.01)

(56) References Cited

U.S. PATENT DOCUMENTS

2013/0049258 A1\* 2/2013 Rotter .................. B29C 70/462
                                                    264/255
2014/0203477 A1\* 7/2014 Chapman .............. B29C 70/462
                                                    264/296

\* cited by examiner

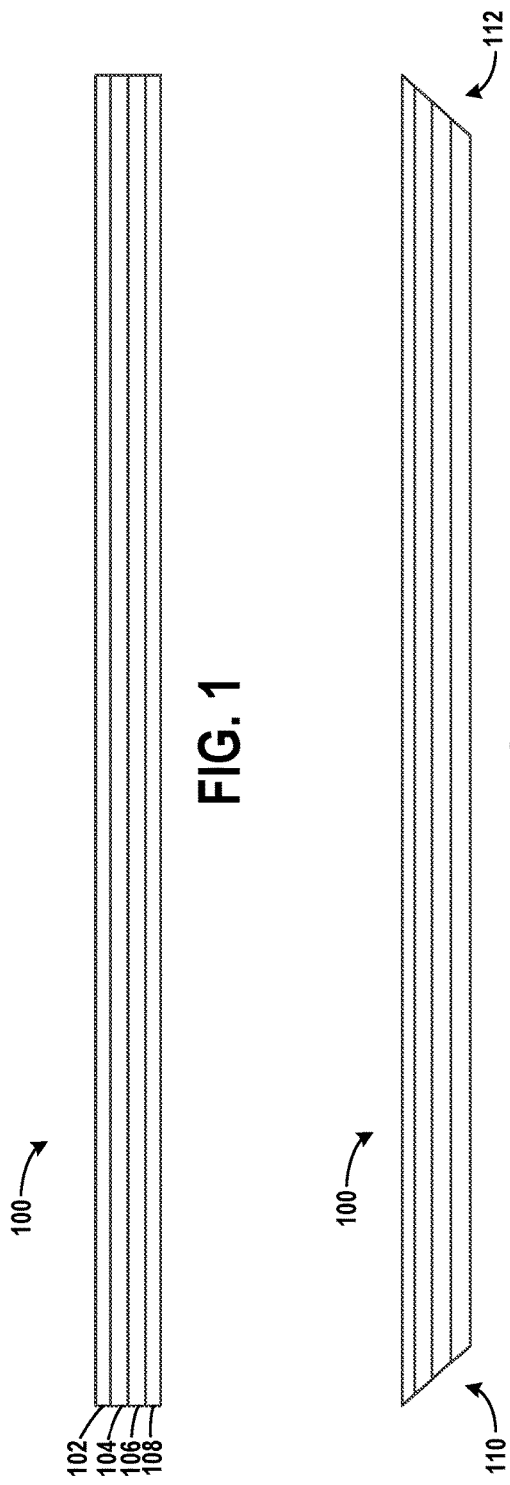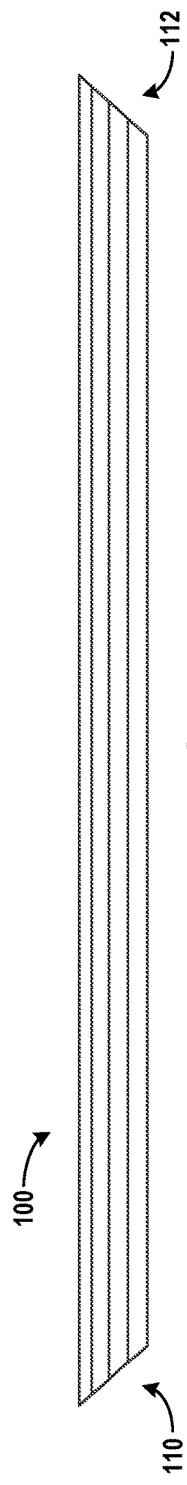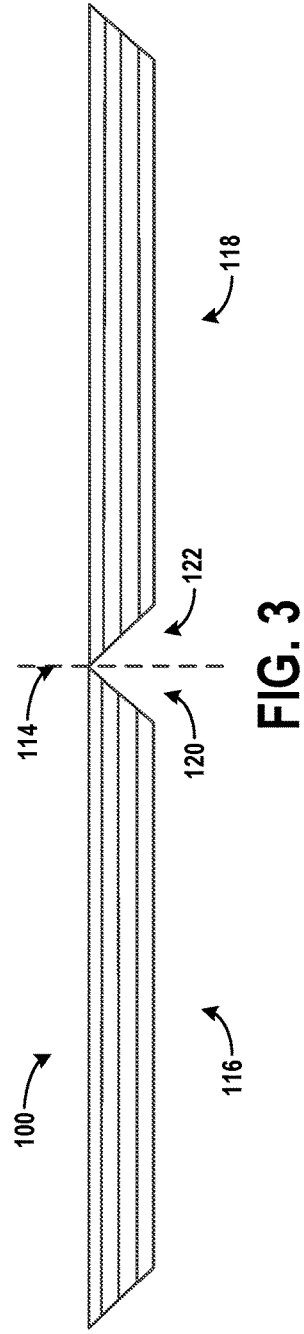

METHODS FOR FORMING A COMPOSITE BLADE STIFFENER AND FACILITATING APPLICATION OF BARELY VISIBLE IMPACT DAMAGE TREATMENTS

FIELD

The present disclosure relates generally to methods for forming a flat composite charge into a composite blade stiffener, and more particularly, to forming the composite blade stiffener to a net form to enable application of barely visible impact damage treatments prior to cure.

BACKGROUND

Composite reinforcing substructures, such as blade stiffeners, sometimes referred to as blade stringers, are commonly used in marine and aircraft industries. These stringers may be fabricated by combining two or more stiffening members. For example, blade-type stringers can be fabricated by combining two members having L or C cross sectional shapes, back-to-back. These members may be formed by manually hot drape forming multiple composite charges over a mandrel or other tool. After forming, the members are placed back-to-back and co-cured in an autoclave. Fabricating blade stringers using multiple separate charges requires multiple tools, is relatively labor intensive and may add to manufacturing flow times.

Structures formed from composite materials, such as blade stiffeners, are susceptible to subsurface damage following an impact. While a surface of a composite structure with low-energy/low-velocity impact damage may show little or no visible signs of damage, such impacts may cause subsurface damage, such as delamination, which may be difficult to detect without sophisticated analysis. To protect for such non-visible damage states, composite structures may be designed with impact witness treatments, which may lower the impact energy required to generate barely visible impact damage (BVID), such that a corresponding generation of BVID will occur due to significant subsurface damage.

To allow for BVID detection, a treatment that may include glass fibers and a matrix material is applied to those composite structures that are at risk for impact damage, such as blade stiffeners on a wing skin panel of an aircraft. To apply this treatment, blade stiffeners generally require post-cure trim operations at a top of a web and subsequent BVID treatment application involving surface preparation, vacuum bagging, and an additional cure cycle. These additional process steps increase a cost of manufacturing this type of structure.

Accordingly, there is a need for a method for forming a composite structure to enable co-cure BVID treatment to be applied directly after forming the composite structure.

SUMMARY

In one example, a method for forming a flat composite charge into a composite blade stiffener is described. The method comprises trimming a flat composite charge to a final design dimension, cutting the flat composite charge along a cut line into a first piece and a second piece separated by edges having an angle, applying a reinforcement ply over the first piece and the second piece to hold the first piece and the second piece together, applying a ply of contact material to a forming mandrel, positioning the first piece and the second piece of the flat composite charge on the ply of contact material on the forming mandrel about a tooling plunger such that the tooling plunger is aligned with the cut line, activating the tooling plunger to contact the reinforcement ply and drive the first piece and the second piece of the flat composite charge into a cavity of the forming mandrel resulting in the first piece and the second piece folding at the cut line, withdrawing the tooling plunger from the cavity of the forming mandrel, compressing the forming mandrel to apply a lateral pressure to the first piece and the second piece folded into the cavity, and applying a vertical pressure to a first flange and a second flange of the first piece and the second piece, respectively, to form the composite blade stiffener.

In another example, a method is described comprising assembling a flat composite charge to a thickness in a predetermined orientation; forming a cut line on the flat composite charge having opposing 45 degree beveled edges angled outward from the cut line, positioning the flat composite charge centered about a tooling plunger such that the tooling plunger is aligned with the cut line, and activating the tooling plunger to move downward and fold the flat composite charge at the cut line into a cavity of a forming mandrel. At completion of movement of the tooling plunger and resulting folding of the flat composite charge, the opposed 45 degree beveled edges form a flat surface perpendicular to the cut line and form a first flange and a second flange connected to the flat surface.

In another example, another method for forming a flat composite charge into a composite blade stiffener is described. The method comprises cutting the flat composite charge along a cut line into two pieces separated by edges having opposing 45 degree edges angled outward from the cut line, positioning the flat composite charge on a forming mandrel about a tooling plunger such that the tooling plunger is aligned with the cut line, activating the tooling plunger to drive the two pieces of the flat composite charge into a cavity of the forming mandrel resulting in the opposed 45 degree edges forming a flat surface perpendicular to the cut line and a first flange and a second flange connected to the flat surface, withdrawing the tooling plunger from the cavity of the forming mandrel, compressing the forming mandrel to apply a lateral pressure to the two pieces folded into the cavity, applying a vertical pressure to the first flange and the second flange to form the composite blade stiffener, applying a barely visible impact damage (BVID) treatment to the composite blade stiffener, and curing both the composite blade stiffener and the BVID treatment during a single curing process.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying drawings, wherein:

FIG. 1 illustrates an example flat composite charge, according to an example.

FIG. 2 illustrates the flat composite charge trimmed to a final design dimension, according to an example.

FIG. 3 illustrates the flat composite charge modified to be formed into a composite blade stiffener, according to an example.

DETAILED DESCRIPTION

Figure 4:
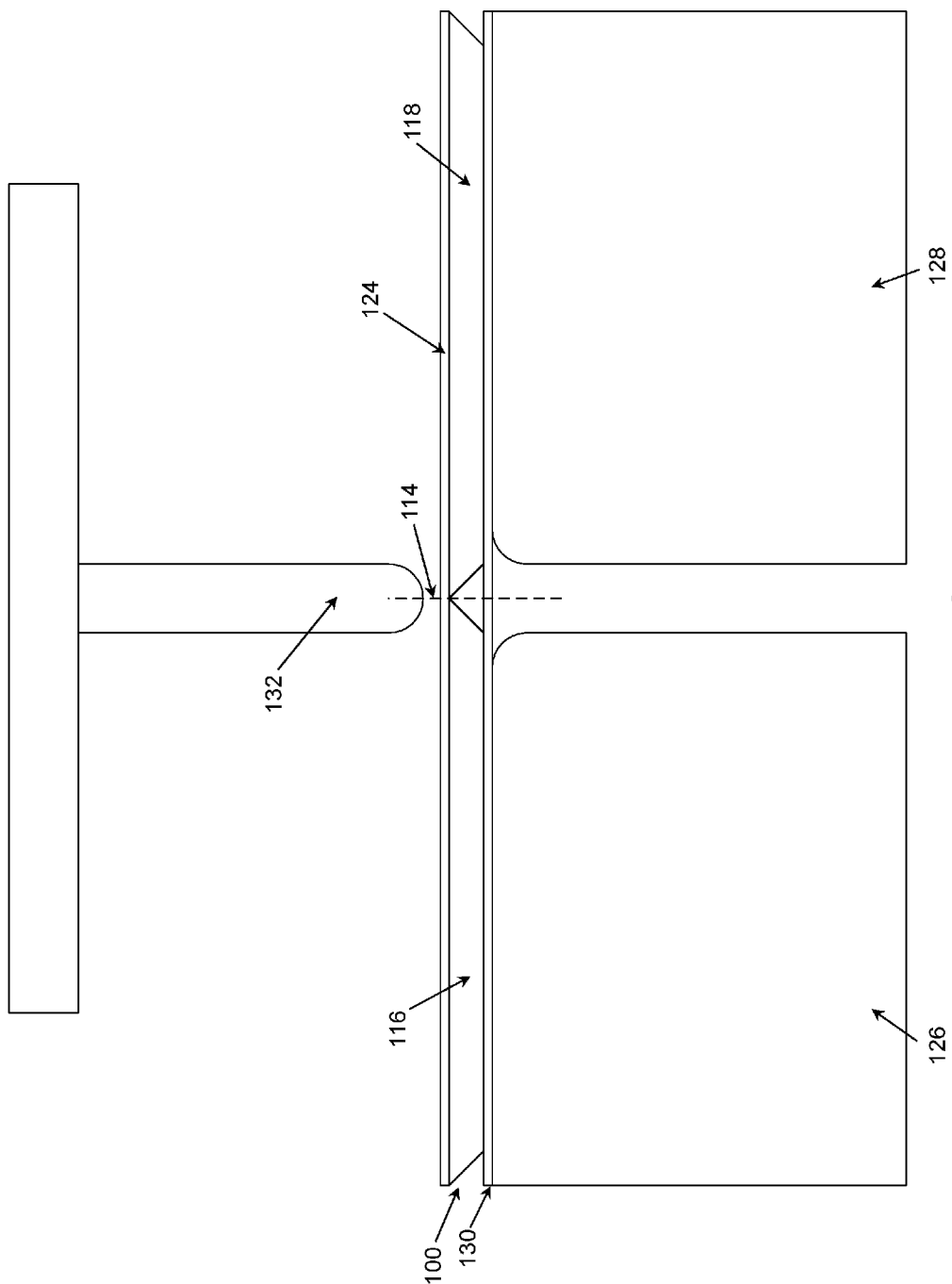
FIG. 4 illustrates the flat composite charge positioned for formation into the composite blade stiffener, according to an example.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example methods described herein relate to fabrication of composite structures, such as processes for forming flat composite charges into reinforcing substructures including blade-type stiffeners and stiffeners that are contoured and/or have a variable gauge. Blade-type stiffeners may be fabricated using a variety of different processes, and generally require post-cure trim operations at a top of a web and subsequent barely visible impact damage (BVID) treatment application involving surface preparation, vacuum bagging, and an additional cure cycle. Example methods described herein relate to forming a flat composite charge into a final design geometry of a blade stiffener, and do not require subsequent processes such as green trim operations after forming, post-cure web trim operations, and post-cure BVID treatment application processes.

The blade stiffener is trimmed to final dimensions and edges are trimmed with specific angles allowing post-formed geometry to match a final design geometry. A reinforcement ply may be used to hold the charge together during the forming operation. A ply of contact material, such as polyester peel ply, may be used to provide tensioning of the charge during the forming operation. The formed blade stiffener structure enables BVID treatment to be applied prior to cure, directly after forming, thus reducing or eliminating multiple processes and related cost that generally would be required for this type of structure. The blade stiffener with the applied BVID treatment can then be co-cured. Co-cure BVID treatment is estimated to save a large percentage of the post cure BVID recurring cost, and will save floor space and non-recurring costs as well.

Referring now to the figures, FIGS. 1-3 illustrate preparation of a flat composite charge 100 for formation into a final design geometry of a composite blade stiffener, according to examples.

FIG. 1 illustrates the flat composite charge 100, according to an example. The flat composite charge 100 includes multiple plies 102, 104, 106, and 108 of composite material that are stacked on top of each other. Example composite material that may be used includes a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. The plies 102, 104, 106, and 108 could be any suitable dimension to provide various degrees of reinforcement, and the flat composite charge 100 could comprise any number of plies of prepreg tape or fabric.

The plies 102, 104, 106, and 108 are laid on top of each other, and lined up to a predetermined dimension and/or predetermined orientation. A number of plies to be stacked may depend on a final design geometry of the flat composite charge 100, and thus, the flat composite charge 100 can be assembled to have a desired thickness in a predetermined orientation. The flat composite charge 100 is then trimmed to a final design dimension.

FIG. 2 illustrates the flat composite charge 100 trimmed to a final design dimension, according to an example. The flat composite charge 100 includes trimmed ends 110 and 112, which are trimmed at an angle to form an angled edge.

Next, to enable the flat composite charge 100 to be formed into a composite blade stiffener, further modifications to the flat composite charge 100 are made as shown in FIG. 3. FIG. 3 illustrates the flat composite charge cut along a cut line 114 into a first piece 116 and a second piece 118, or into two pieces, according to an example. In the example shown in FIG. 3, the cut line 114 is an approximate centerline of the flat composite charge 100. In other examples, the cut line 114 is off center for other final design geometries of the composite blade stiffener.

The flat composite charge 100 is cut while laid flat so as to be formed into a net profile desired for a final design geometry to reduce processing costs related to any additional post-processing that would otherwise be required.

The first piece 116 and the second piece 118 are separated by edges 120 and 122 having an angle. In the example shown in FIG. 3, the angle is 45 degrees, or may be about 45 degrees. In other examples, the angle may be less than or greater than 45 degrees, such as in a range of about 30 degrees to about 80 degrees. In still further examples, the angle can be in a range that is less than 90 degrees and greater than 0 degrees based on a final design geometry of the composite blade stiffener.

By the terms "substantially" or "about" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

In FIG. 3, the edges 120 and 122 are shown as opposing 45 degree edges angled outward from the cut line 114. The edges 120 and 122 may be considered beveled edges in some examples.

Once the flat composite charge 100 is prepared, the flat composite charge 100 can be positioned onto a forming mandrel for formation into the composite blade stiffener.

FIG. 4 illustrates the flat composite charge 100 positioned for formation into the composite blade stiffener, according to an example. Initially, a reinforcement ply 124 is applied over the first piece 116 and the second piece 118 (e.g., the two pieces) to hold the first piece 116 and the second piece 118 together after being cut. For example, the reinforcement ply 124 is applied over the flat composite charge 100. In an example, the reinforcement ply 124 is a composite fabric ply.

A forming mandrel including a first block 126 and a second block 128 are used, and a ply of contact material 130 is applied to the first block 126 and the second block 128 of the forming mandrel. In an example, the ply of contact material 130 is a polyester peel ply. In further examples, more than one layer of ply or more than one ply may be used.

The flat composite charge 100 including the first piece 116 and the second piece 118 is then positioned on the ply of contact material 130 on the first block 126 and the second block 128 of the forming mandrel about a tooling plunger 132 such that the tooling plunger 132 is aligned with the cut line 114 or centered in relation to the angled edges. In one example, the flat composite charge 100 is centered about the tooling plunger 132. In other examples, the flat composite charge 100 is off center for other final design geometries of the composite blade stiffener. The tooling plunger 132 may then be activated.

Figure 5:
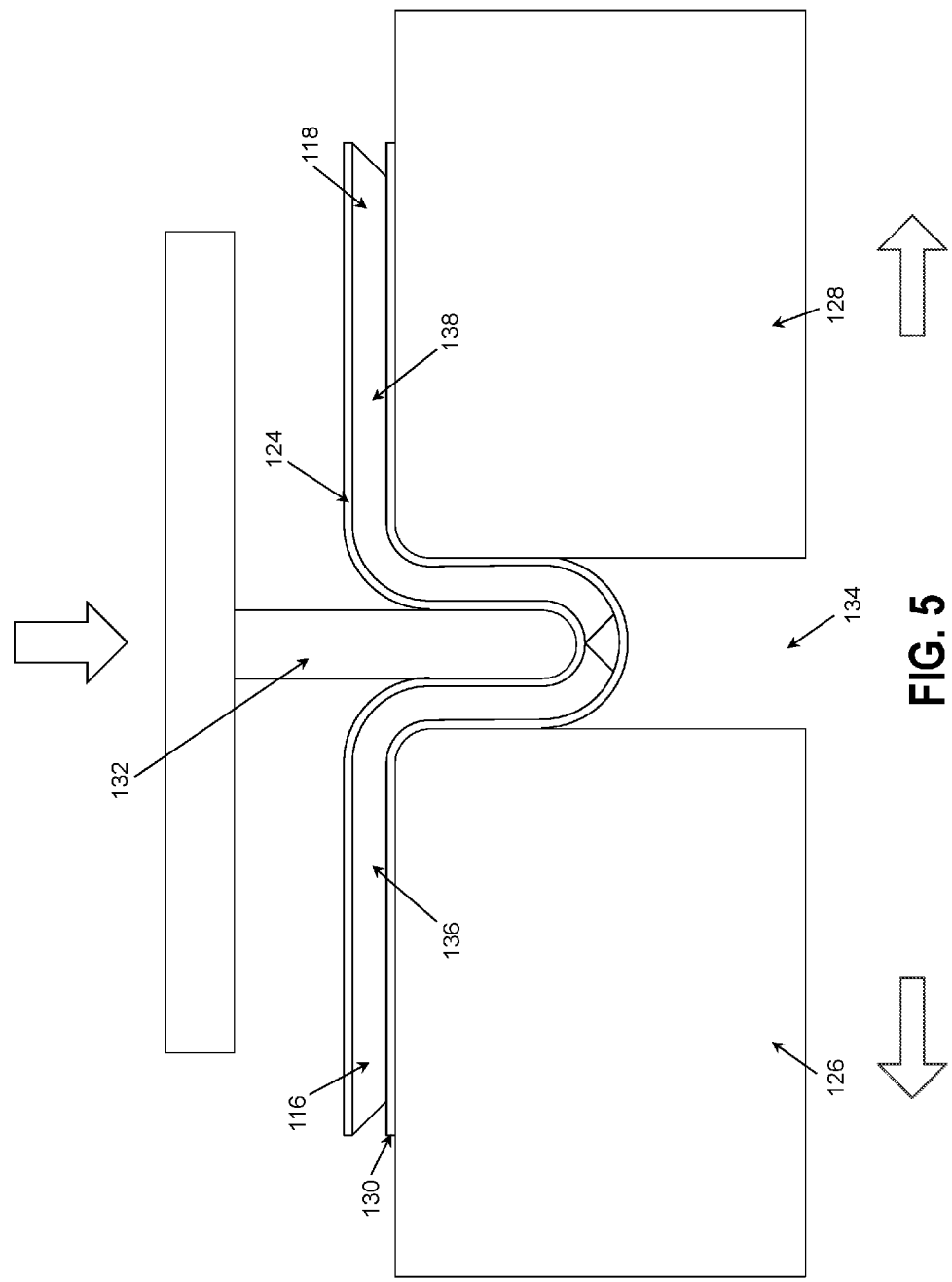
FIG. 5 illustrates activation of the tooling plunger and formation of the flat composite charge into the composite blade stiffener, according to an example.

FIG. 5 illustrates activation of the tooling plunger 132, according to an example. The tooling plunger 132 is activated to contact the reinforcement ply 124 and drive the first piece 116 and the second piece 118 of the flat composite charge 100 into a cavity 134 of the first block 126 and the second block 128 of the forming mandrel resulting in the first piece 116 and the second piece 118 folding at the cut line 114 about the tooling plunger 132. In one example, the first block 126 and the second block 128 of the forming mandrel are separated as the tooling plunger 132 moves downward, as shown in FIG. 5. The reinforcement ply 124 will help to hold the first piece 116 and the second piece 118 together during punch down of the tooling plunger 132.

Within examples, the flat composite charge 100 is heated prior to activating the tooling plunger 132. In one example, the flat composite charge is heated to about 130 degrees F. To drive the tooling plunger 132 downward and cause the first piece 116 and the second piece 118 of the flat composite charge 100 into the cavity, a force of less than 100 lbs per foot may be applied, and in some examples, the activation of the tooling plunger 132 occurs in less than about 5 minutes after heating the flat composite charge.

Figure 6:
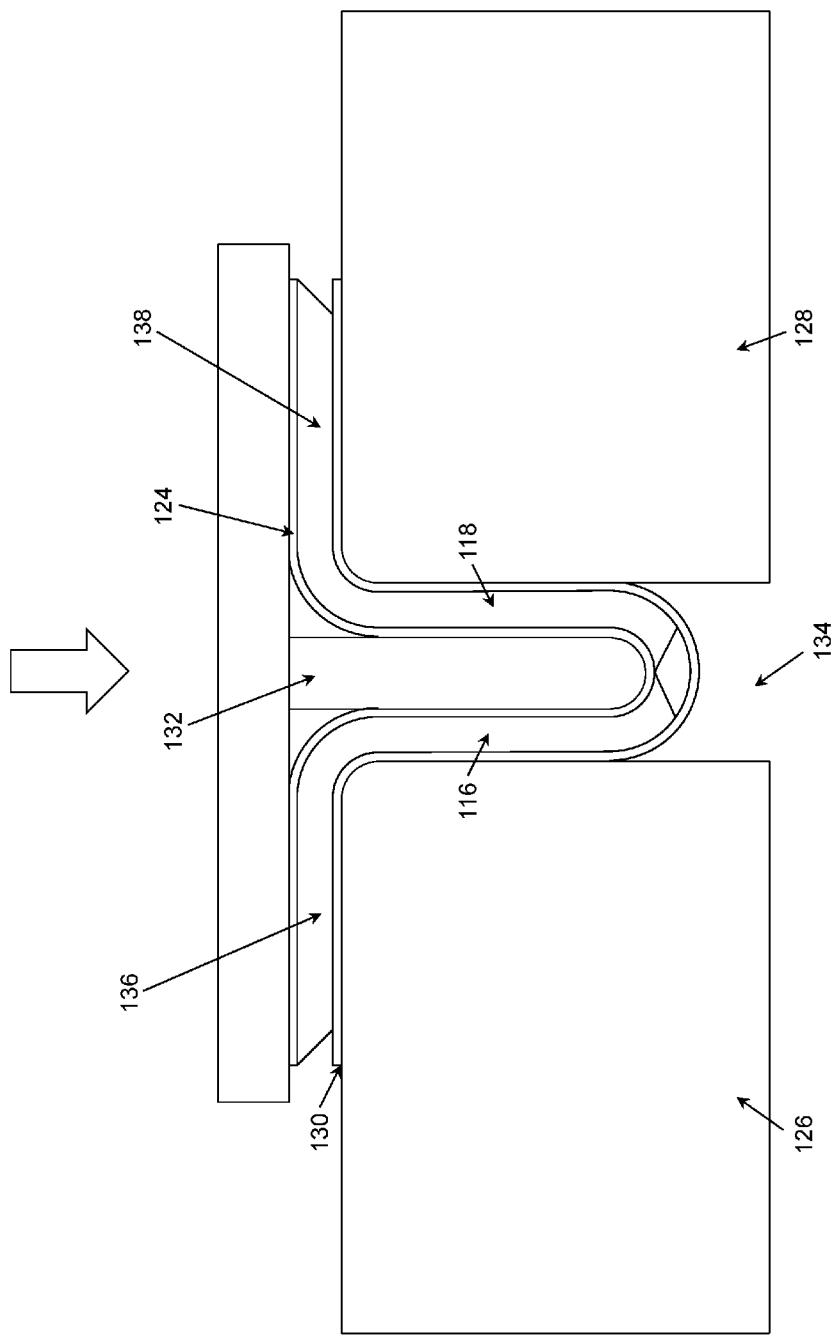
FIG. 6 illustrates completion of the tooling plunger motion and further formation of the flat composite charge into the composite blade stiffener, according to an example.

FIG. 6 illustrates completion of the tooling plunger motion and further formation of the flat composite charge 100 into the composite blade stiffener, according to an example.

Figure 7:
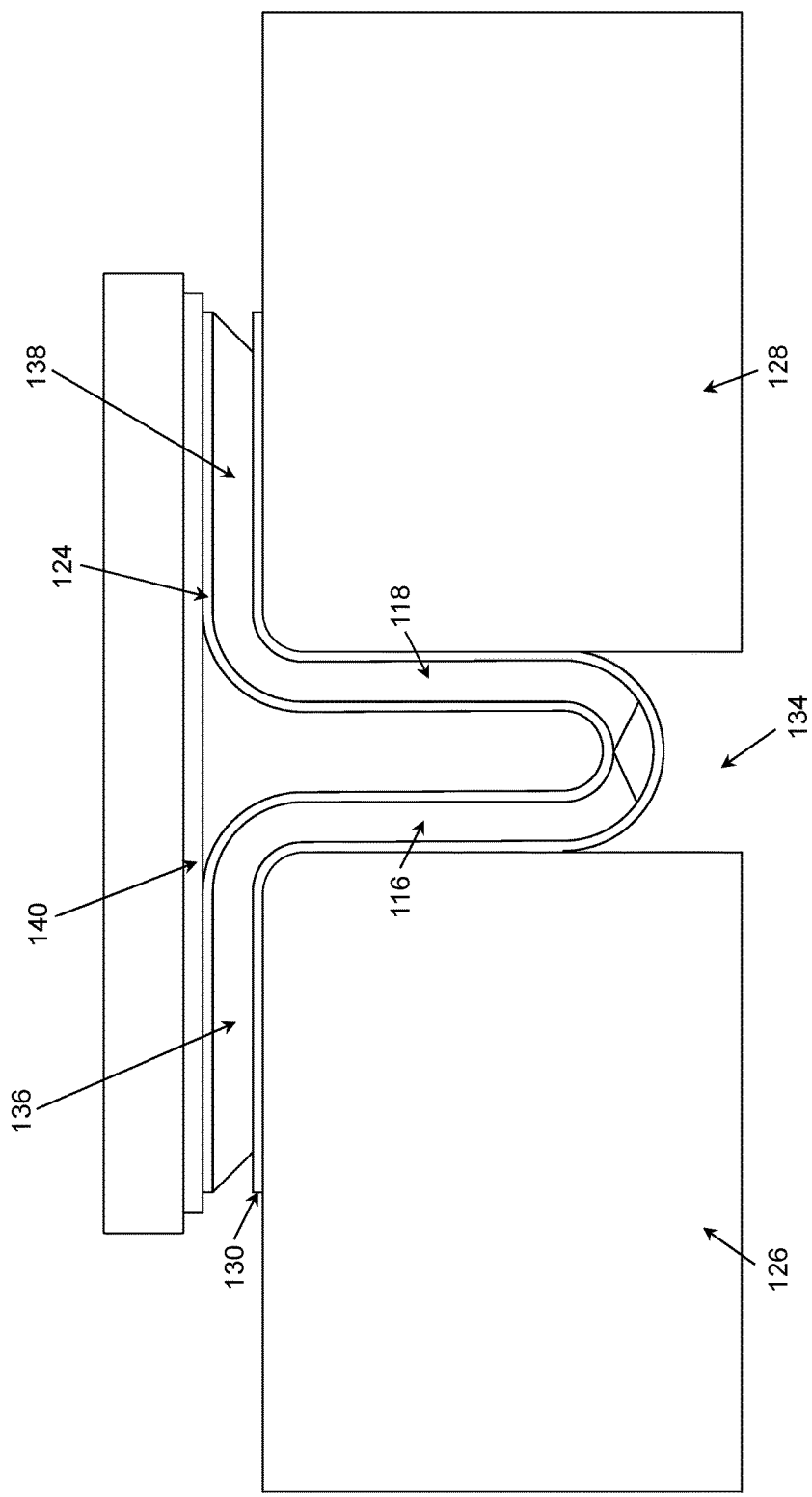
FIG. 7 illustrates removal of the tooling plunger, according to an example.

FIG. 7 illustrates removal of the tooling plunger 132. After activation of the tooling plunger 132, the tooling plunger 132 can be withdrawn from the cavity 134 of the forming mandrel. To withdraw the tooling plunger 132, the tooling plunger is lifted out of the cavity 134. In some examples, a plate 140 is loaded over a first flange 136 and a second flange 138 of the first piece and the second piece 118, respectively, following withdrawal and removal of the tooling plunger 132 from the cavity 134 of the forming mandrel, and a vertical pressure is applied to the first flange 136 and the second flange 138 using the plate 140. The vertical pressure may be less than 1 psi in this instance, for example.

Figure 8:
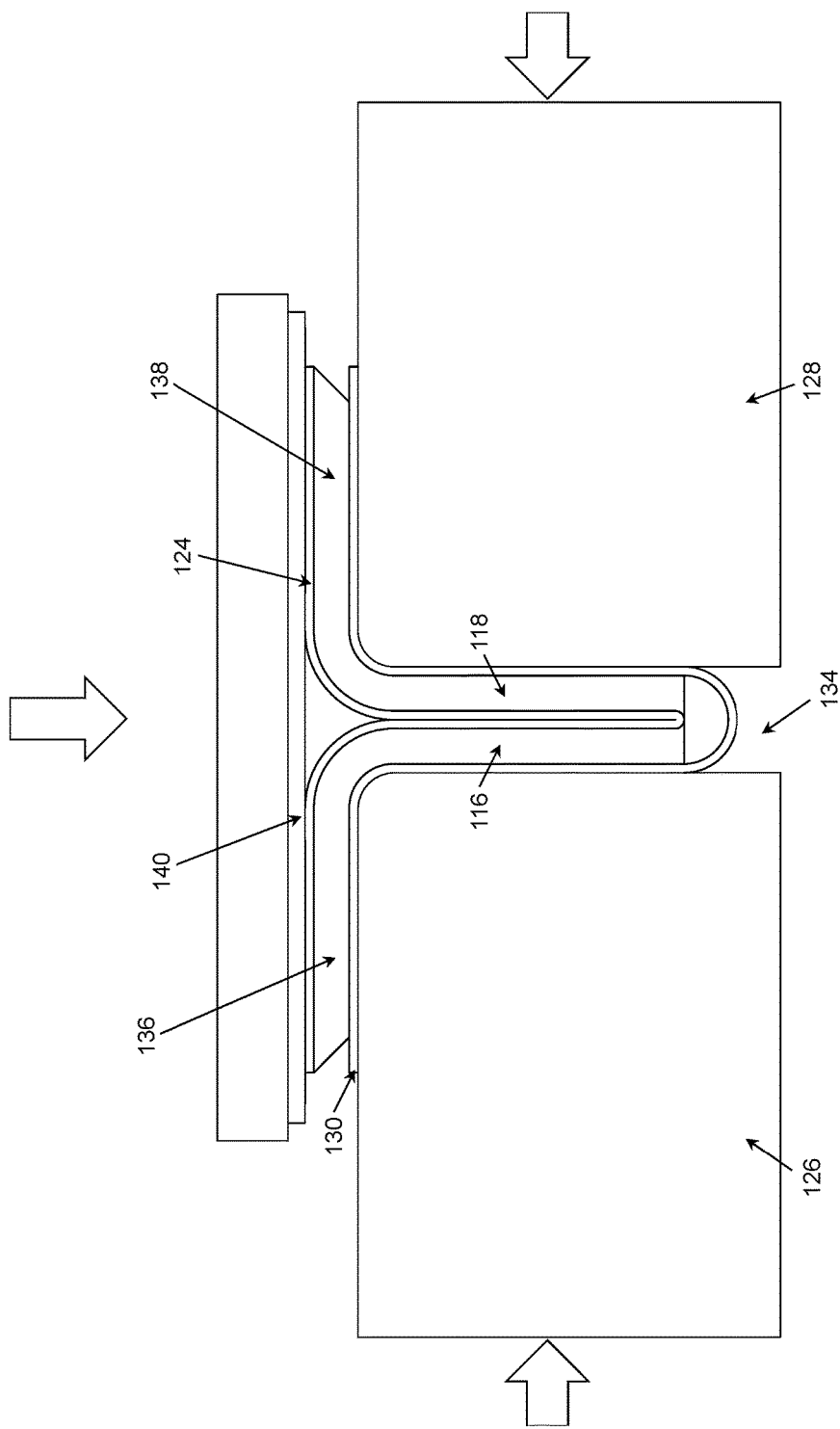
FIG. 8 illustrates yet further formation of the flat composite charge into the composite blade stiffener, according to an example.

FIG. 8 illustrates yet further formation of the flat composite charge 100 into the composite blade stiffener as the first block 126 and the second block 128 of the forming mandrel are compressed to apply a lateral pressure to a portion of the first piece 116 and to a portion of the second piece 118 folded into the cavity 134. The lateral pressure may be applied by air hoses (not shown) pushing the first block 126 and the second block 128 toward each other. In addition, following application of lateral pressure, a greater vertical pressure is applied to the first flange 136 and the second flange 138 of the first piece 116 and the second piece 118, respectively, to form the composite blade stiffener.

Figure 9:
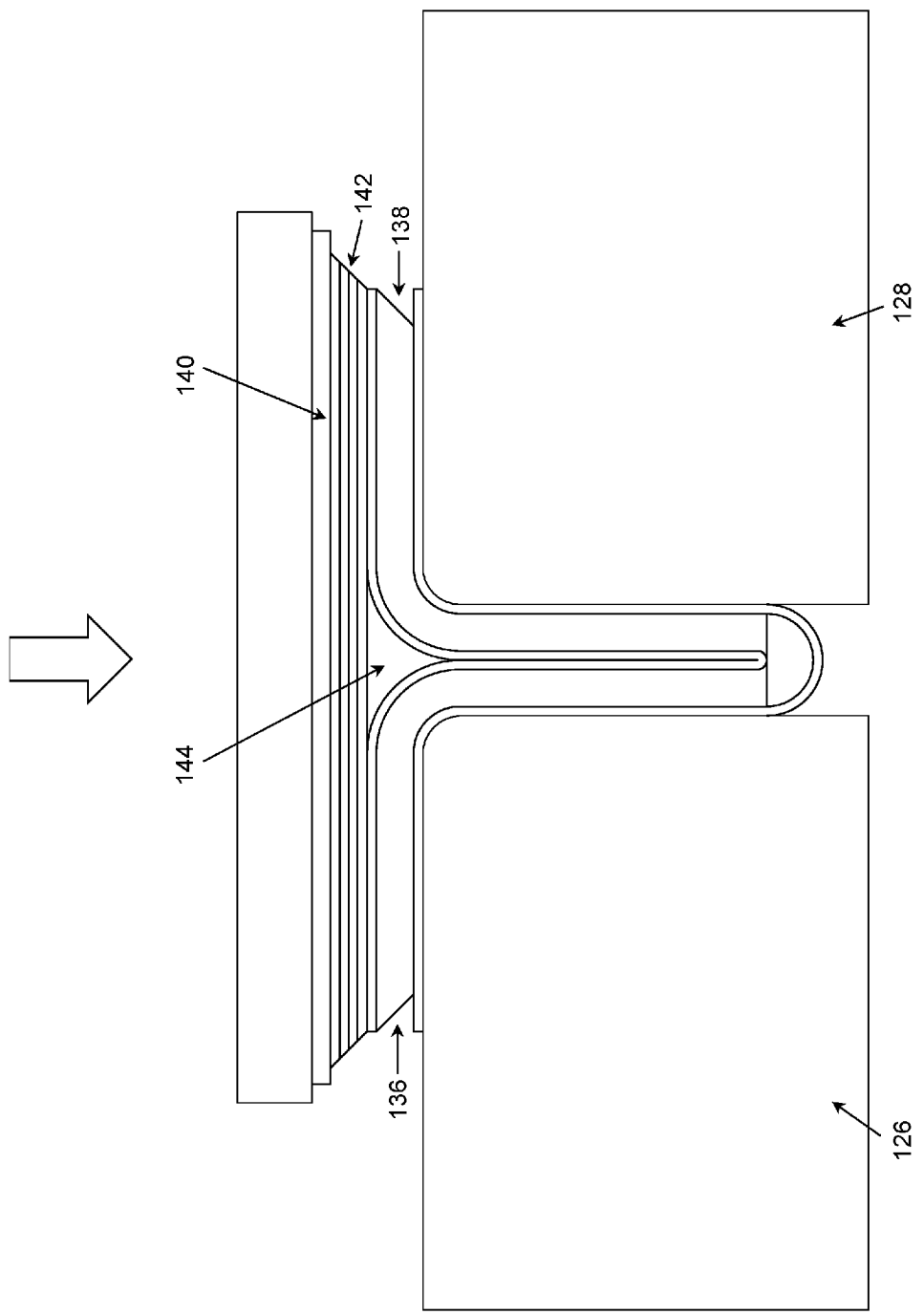
FIG. 9 shows another version of the formed composite blade stiffener, according to an example.

FIG. 9 illustrates yet further formation of the flat composite charge 100 into the composite blade stiffener, according to an example. A filler 144 can be applied between the first flange 136 and the second flange 138, and additional plies 142 can be stacked on top of the first flange 136 and the second flange 138. To do so, the plate 140 is lifted, and the additional materials are added. Following, additional vertical and lateral pressure can then be applied as well.

Figure 10:
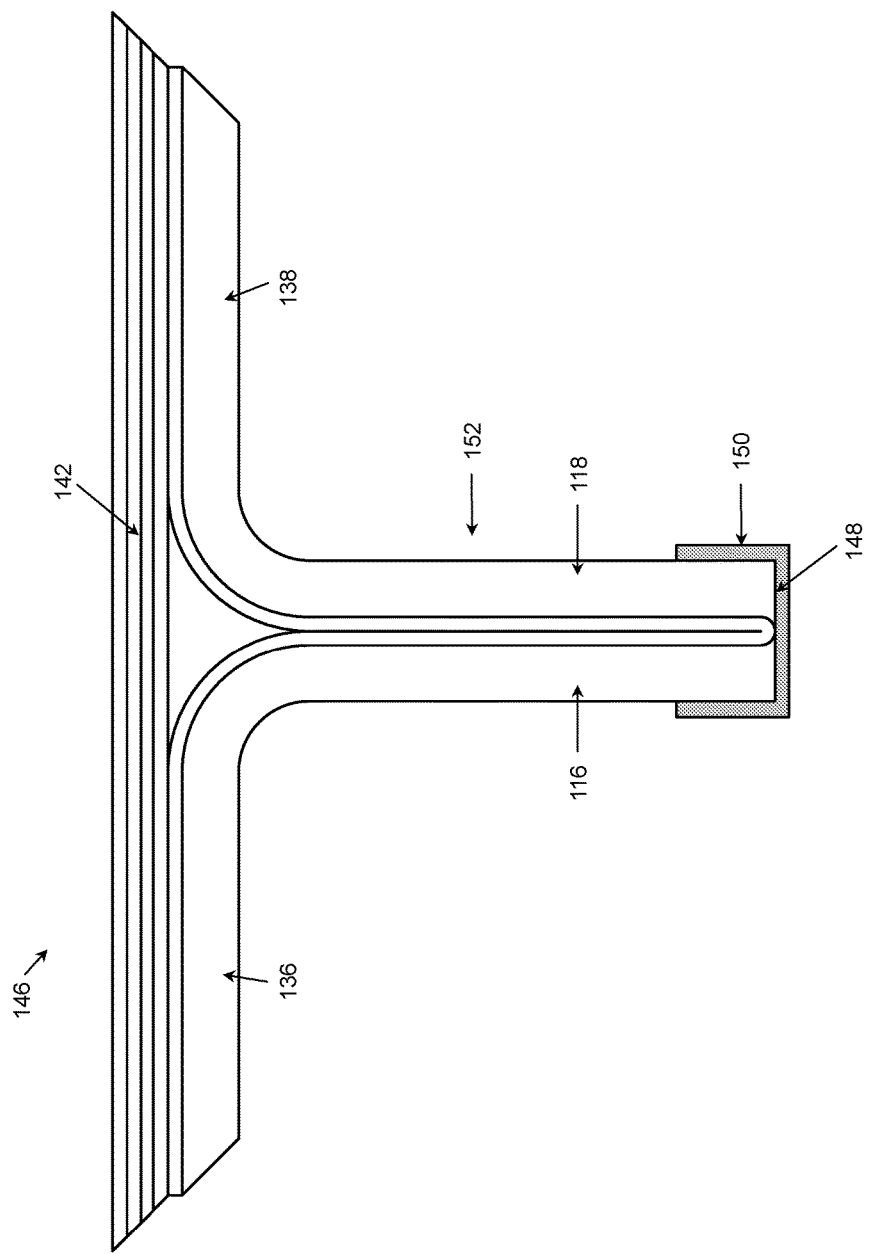
FIG. 10 illustrates an example of the composite blade stiffener, according to an example.

FIG. 10 illustrates an example of the composite blade stiffener 146, according to an example. At completion of movement of the tooling plunger 132 and resulting folding of the flat composite charge 100, the opposed 45 degree edges 120 and 122 form a flat surface 148 aligned with, perpendicular to, or along the cut line 114 and form a web 152 and the first flange 136 and the second flange 138 are connected to the flat surface 148. Thus, the flat surface 148, the first flange 136 and the second flange 138, and the web 152 connected to the flat surface 148, form the composite blade stiffener 146. Within an example, applying the vertical pressure to the first flange 136 and the second flange 138 of the first piece 116 and the second piece 118, respectively, to form the composite blade stiffener 146 includes applying the vertical pressure to form a T-shaped structure with a substantially flat top in relation to the web 152, as shown in FIG. 8. The initial 45 degree cut angle enables formation of the composite blade stiffener 146 in the final design geometry having the flat surface 148 perpendicular to the web 152.

In some examples, a barely visible impact damage (BVID) treatment 150 is then applied to the composite blade stiffener 146. The BVID treatment 150 is provided to enable impact damage to the composite blade stiffener 146 to be visible. For example, during fabrication or in-service, impact to the composite blade stiffener 146 can cause internal or non-visible damage since damage to composite materials is often difficult to visualize. The BVID treatment 150, however, will show damage above a certain energy/velocity threshold (to avoid false positive indications). In an example, the BVID treatment 150 may include a fiberglass overwrap or clear resin material, which acts as a witness strip, such that when impacted, the fiberglass will be physically altered and impact damage can be visually determined. Thus, the fiberglass overwrap can be used to identify imperfections in the composite blade stiffener 146 due to impact.

The BVID treatment 150 can be applied to the flat surface 148 and the web 152, as shown in FIG. 10. After application of the BVID treatment 150, both the composite blade stiffener 146 and the BVID treatment 150 can be cured during a single curing process.

Figure 11:
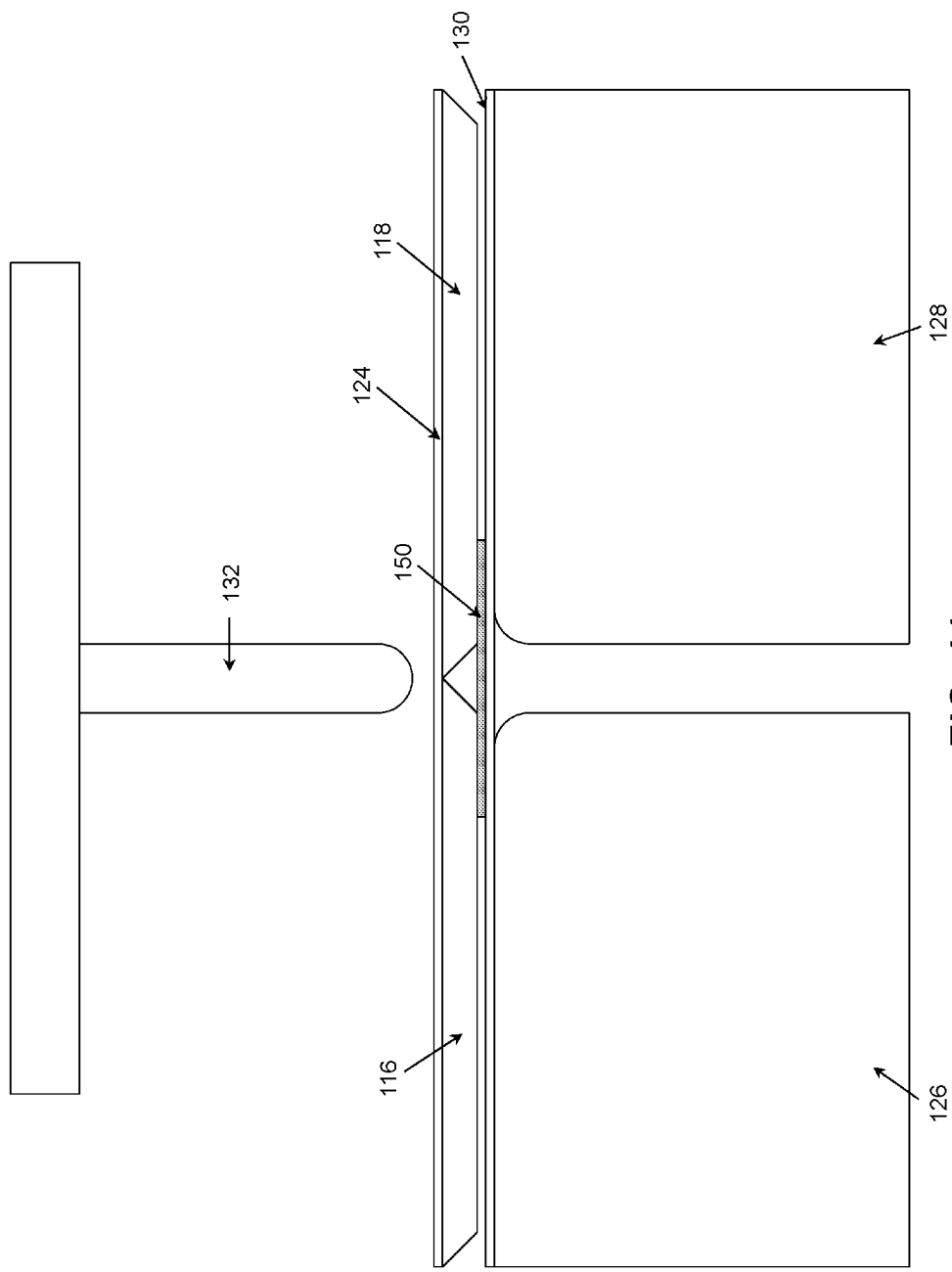
FIG. 11 illustrates another example formation of the flat composite charge into the composite blade stiffener, according to an example.

FIG. 11 illustrates another example formation of the flat composite charge 100 into the composite blade stiffener 146, according to an example. In FIG. 11, the BVID treatment 150 is shown to be applied to a bottom surface of the first piece 116 and the second piece 118 of the flat composite charge 100 prior to activation of the tooling plunger 132 and formation of the composite blade stiffener 146. Thus, the BVID treatment 150 can be applied before or after formation of the composite blade stiffener 146. In either example, both the composite blade stiffener 146 and the BVID treatment 150 can be cured during a single curing process to save time and money.

Figure 12:
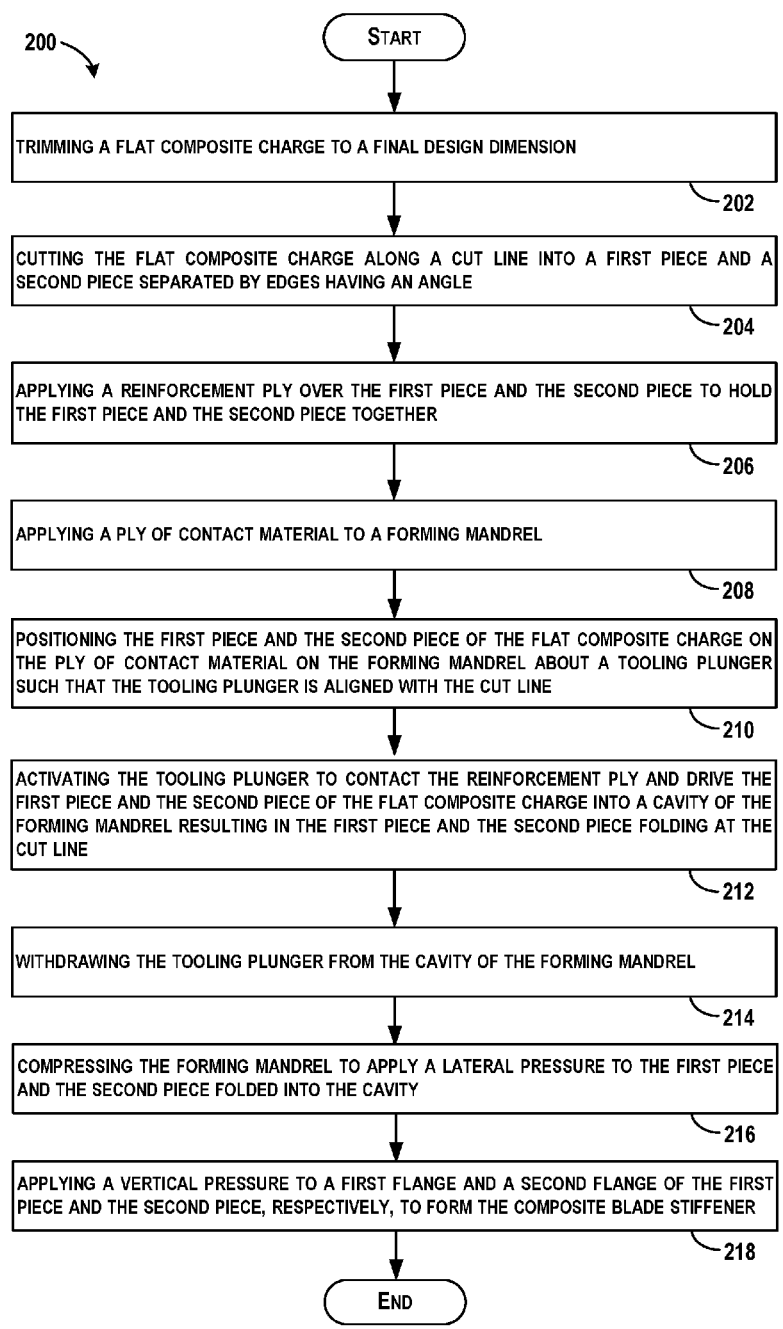
FIG. 12 shows a flowchart of an example method for forming the flat composite charge into the composite blade stiffener, according to an example.

FIG. 12 shows a flowchart of an example method 200 for forming the flat composite charge 100 into the composite blade stiffener 146, according to an example. Method 200 shown in FIG. 12 presents an example of a method that could be used during formation of the composite blade stiffener 146 as shown in FIGS. 4-11, for example. Further, devices or systems may be used or configured to perform logical functions presented in FIG. 12. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 200 may include one or more operations, functions, or actions as illustrated by one or more of blocks 202-218. Also, the various blocks may be combined into fewer blocks, divided into additional blocks, and/or removed based upon the desired implementation.

It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes trimming the flat composite charge 100 to a final design dimension. The final design dimension may include a specified thickness as well as specified length of the flat composite charge 100, for example.

At block 204, the method 200 includes cutting the flat composite charge 100 along the cut line 114 into the first piece 116 and the second piece 118 separated by the edges 120 and 122 having an angle. In an example, cutting the flat composite charge 100 along the cut line 114 includes cutting the flat composite charge 100 along a centerline. In further examples, the cutting results in the edges 120 and 122 having about a 45 degree angle, and the edges 120 and 122 may be angled outward from the cut line 114.

At block 206, the method 200 includes applying the reinforcement ply 124 over the first piece 116 and the second piece 118 to hold the first piece 116 and the second piece 118 together. The reinforcement ply 124 may include a composite fabric ply.

At block 208, the method 200 includes applying the ply of contact material 130 to a forming mandrel. The ply of contact material 130 may include a polyester peel ply.

At block 210, the method 200 includes positioning the first piece 116 and the second piece 118 of the flat composite charge 100 on the ply of contact material 130 on the forming mandrel about the tooling plunger 132 such that the tooling plunger 132 is aligned with or perpendicular to the cut line 114. In some examples, the first piece 116 and the second piece 118 are positioned to be centered in relation to the edges having an angle.

At block 212, the method 200 includes activating the tooling plunger 132 to contact the reinforcement ply 124 and drive the first piece 116 and the second piece 118 of the flat composite charge 100 into the cavity 134 of the forming mandrel resulting in the first piece 116 and the second piece 118 folding at the cut line 114. The first piece 116 and the second piece may also fold about the tooling plunger 132. In some examples, the flat composite charge 100 is heated prior to activating the tooling plunger 132.

At block 214, the method 200 includes withdrawing the tooling plunger 132 from the cavity 134 of the forming mandrel. In one example, the tooling plunger 132 may be removed from the forming mandrel as well.

At block 216, the method 200 includes compressing the forming mandrel to apply a lateral pressure to the first piece 116 and the second piece 118 folded into the cavity 134. The lateral pressure forms the first piece 116 and the second piece 118 into a substantially flat section, for example.

At block 218, the method 200 includes applying a vertical pressure to the first flange 136 and the second flange 138 of the first piece 116 and the second piece 118, respectively, to form the composite blade stiffener 146. Applying the vertical pressure forms a T-shaped structure with a substantially flat top in relation to the web 152, for example.

Within examples, the method 200 may additionally include loading the plate 140 over the first flange 136 and the second flange 138 following withdrawal of the tooling plunger 132 from the cavity 134 of the forming mandrel, and applying the vertical pressure to the first flange 136 and the second flange 138 using the plate 140.

Within additional examples, the method 200 may also include applying the BVID 150 treatment to the composite blade stiffener 146, and curing both the composite blade stiffener 146 and the BVID treatment 150 during a single curing process.

Figure 13:
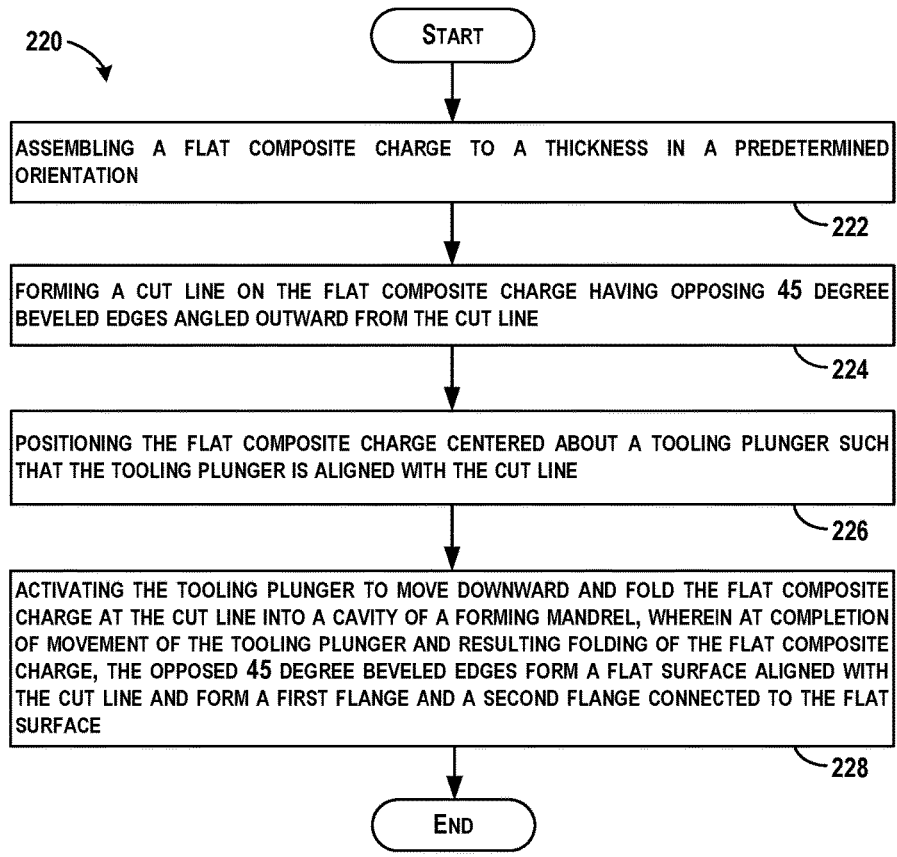
FIG. 13 shows a flowchart of another example method, according to an example.

FIG. 13 shows a flowchart of an example method 220, according to an example. Method 220 shown in FIG. 13 presents an example of a method that could be used during formation of the composite blade stiffener 146 as shown in FIGS. 4-11, for example. Further, devices or systems may be used or configured to perform logical functions presented in FIG. 13. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 220 may include one or more operations, functions, or actions as illustrated by one or more of blocks 222-228. Also, the various blocks may be combined into fewer blocks, divided into additional blocks, and/or removed based upon the desired implementation.

At block 222, the method 220 includes assembling the flat composite charge 100 to a thickness in a predetermined orientation. At block 224, the method 220 includes forming the cut line 114 on the flat composite charge 100 having opposing 45 degree beveled edges 120 and 122 angled outward from the cut line 114. At block 226, the method 220 includes positioning the flat composite charge 100 centered about the tooling plunger 132 such that the tooling plunger 132 is aligned with the cut line 114.

At block 228, the method 220 includes activating the tooling plunger 132 to move downward and fold the flat composite charge 100 at the cut line 114 into the cavity 134 of a forming mandrel, and at completion of movement of the tooling plunger 132 and resulting folding of the flat composite charge 100, the opposed 45 degree beveled edges 120 and 122 form the flat surface 148 aligned with, or perpendicular to the cut line 114 and form the first flange 136 and the second flange 138 connected to the flat surface 148. In examples, at completion, the web 152 is also formed connected to the flat surface 148. In some examples, the flat composite charge 100 is heated prior to activating the tooling plunger 132, and the forming mandrel is separated as the tooling plunger 132 moves downward.

Within examples, the method 220 may additionally include applying the reinforcement ply 124 over the flat composite charge 100 prior to activation of the tooling plunger 132.

Within other examples, the method 220 may additionally include loading the plate 140 over the first flange 136 and the second flange 138 following withdrawal of the tooling plunger 132 from the cavity 134 of the forming mandrel, and applying a vertical pressure to the first flange 136 and the second flange 138 using the plate 140.

Within still other examples, the flat surface 148, and the first flange 136 and the second flange 138 and the web 152 connected to the flat surface 148, form the composite blade stiffener 146, and the method 220 may additionally include applying the BVID treatment 150 to the composite blade stiffener 146, and curing both the composite blade stiffener 146 and the BVID treatment 150 during a single curing process.

Figure 14:
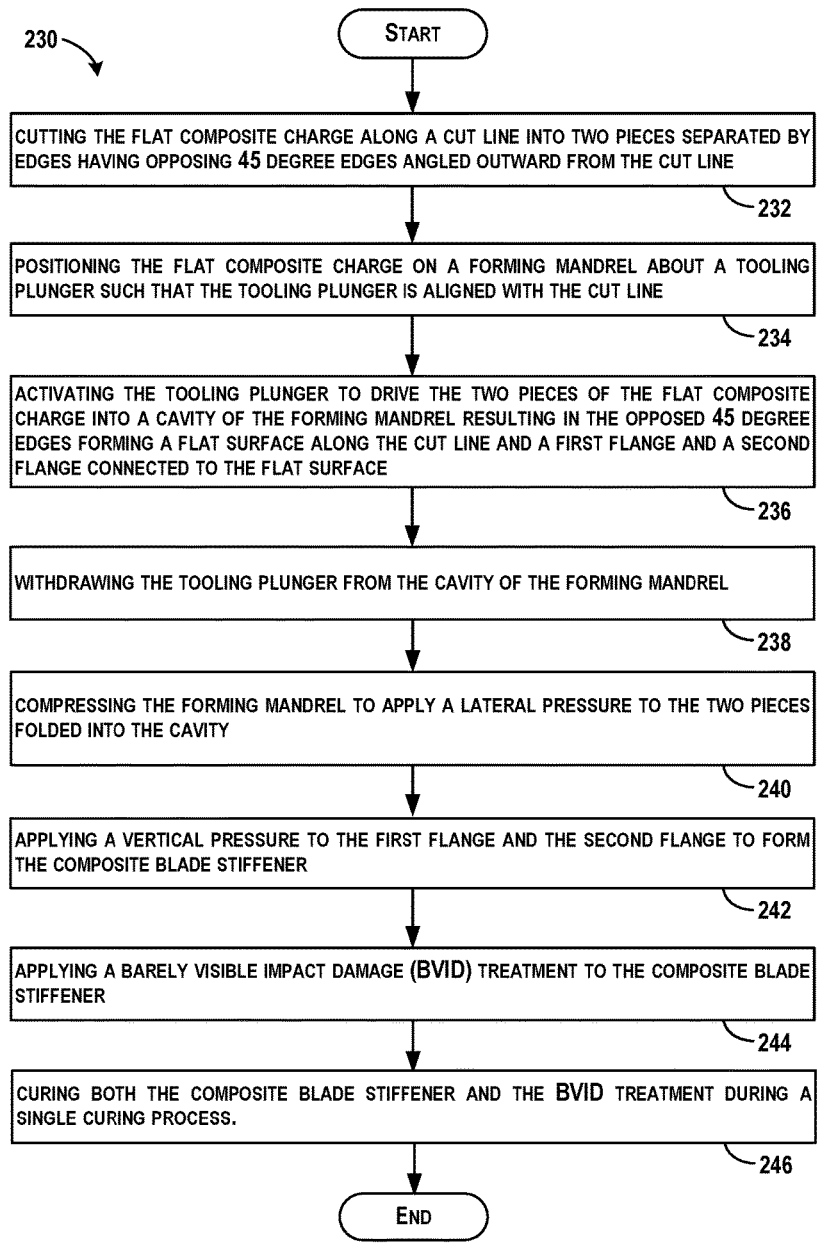
FIG. 14 shows a flowchart of another example method for forming the flat composite charge into the composite blade stiffener, according to an example.

FIG. 14 shows a flowchart of another example method 230 for forming the flat composite charge 100 into the composite blade stiffener 146, according to an example. Method 230 shown in FIG. 14 presents an example of a method that could be used during formation of the composite blade stiffener 146 as shown in FIGS. 4-11, for example. Further, devices or systems may be used or configured to perform logical functions presented in FIG. 14. In some instances, components of the devices and/or systems may be configured to perform the functions such that the components are actually configured and structured (with hardware and/or software) to enable such performance. In other examples, components of the devices and/or systems may be arranged to be adapted to, capable of, or suited for performing the functions, such as when operated in a specific manner. Method 230 may include one or more operations, functions, or actions as illustrated by one or more of blocks 232-246. Also, the various blocks may be combined into fewer blocks, divided into additional blocks, and/or removed based upon the desired implementation.

At block 232, the method 230 includes cutting the flat composite charge 100 along the cut line 114 into two pieces 116 and 118 separated by edges 120 and 122 having opposing 45 degree edges angled outward from the cut line 114. At block 234, the method 230 includes positioning the flat composite charge 100 on a forming mandrel about the tooling plunger 132 such that the tooling plunger 132 is aligned with the cut line 114 or centered in relation to the 45 degree edges. At block 236, the method 230 includes activating the tooling plunger 132 to drive the two pieces 116 and 118 of the flat composite charge 100 into the cavity 134 of the forming mandrel resulting in the opposed 45 degree edges 120 and 122 forming the flat surface 148 along the cut line 114 and the first flange 136 and the second flange 138 connected to the flat surface 148. At block 238, the method 230 includes withdrawing the tooling plunger 132 from the cavity 134 of the forming mandrel. At block 240, the method 230 includes compressing the forming mandrel to apply a lateral pressure to the two pieces 116 and 118 folded into the cavity 134. At block 242, the method 230 includes applying a vertical pressure to the first flange 136 and the second flange 138 to form the composite blade stiffener 146. At block 244, the method 230 includes applying the BVID treatment 150 to the composite blade stiffener 146. At block 246, the method 230 includes curing both the composite blade stiffener 146 and the BVID treatment 150 during a single curing process.

Within examples, the method 230 may additionally include applying the reinforcement ply 124 over the two pieces 116 and 118 to hold the two pieces 116 and 118 together.

Within other examples, the method 230 may additionally include applying the ply of contact material 130 to the forming mandrel, and positioning the flat composite charge 100 on the ply of contact material 130 on the forming mandrel.

Within still other examples, the method 230 may additionally include loading the plate 140 over the first flange 136 and the second flange 138 following withdrawal of the tooling plunger 132 from the cavity 134 of the forming mandrel, and applying the vertical pressure to the first flange 136 and the second flange 138 using the plate 140.

Using examples described herein, additional post-processing of the composite blade stiffener 146 can be reduced or eliminated since the flat composite charge 100 is prepared to enable formation of the composite blade stiffener 146 into the final net profile with no additional trimming required. Further, this enables application of the BVID treatment 150 and curing of the composite blade stiffener 146 and the BVID treatment 150 at the same time during a single cure process.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method comprising:
   assembling a flat composite charge to a thickness in a predetermined orientation;
   forming a cut line on the flat composite charge having opposing 45 degree beveled edges angled outward from the cut line;
   positioning the flat composite charge centered about a tooling plunger such that the tooling plunger is aligned with the cut line; and
   activating the tooling plunger to move downward and fold the flat composite charge at the cut line into a cavity of a forming mandrel, wherein at completion of movement of the tooling plunger and resulting folding of the flat composite charge, the opposing 45 degree beveled edges form a flat surface perpendicular to the cut line and form a first flange and a second flange connected to the flat surface.

2. The method of claim 1, further comprising:
separating the forming mandrel as the tooling plunger moves downward.

3. The method of claim 1, further comprising:
applying a reinforcement ply over the flat composite charge.

4. The method of claim 1, further comprising:
loading a plate over the first flange and the second flange following withdrawal of the tooling plunger from the cavity of the forming mandrel; and
applying a vertical pressure to the first flange and the second flange using the plate.

5. The method of claim 1, wherein the flat surface and the first flange and the second flange connected to the flat surface form a composite blade stiffener, and the method further comprises:
applying a barely visible impact damage (BVID) treatment to the composite blade stiffener; and
curing both the composite blade stiffener and the BVID treatment during a single curing process.

6. The method of claim 1, further comprising:
heating the flat composite charge prior to activating the tooling plunger.

7. A method for forming a flat composite charge into a composite blade stiffener, comprising:
trimming a flat composite charge to a final design dimension;
cutting the flat composite charge along a cut line into a first piece and a second piece separated by edges having an angle;
applying a reinforcement ply over the first piece and the second piece to hold the first piece and the second piece together;
applying a ply of contact material to a forming mandrel;
positioning the first piece and the second piece of the flat composite charge on the ply of contact material on the forming mandrel about a tooling plunger such that the tooling plunger is aligned with the cut line;
activating the tooling plunger to contact the reinforcement ply and drive the first piece and the second piece of the flat composite charge into a cavity of the forming mandrel resulting in the first piece and the second piece folding at the cut line;
withdrawing the tooling plunger from the cavity of the forming mandrel;
compressing the forming mandrel to apply a lateral pressure to the first piece and the second piece folded into the cavity; and
applying a vertical pressure to a first flange and a second flange of the first piece and the second piece, respectively, to form the composite blade stiffener.

8. The method of claim 7, wherein cutting the flat composite charge along the cut line comprises cutting the flat composite charge along a centerline.

9. The method of claim 7, wherein cutting the flat composite charge along the cut line into the first piece and the second piece separated by the edges having the angle comprises cutting the edges to have about a 45 degree angle.

10. The method of claim 7, wherein cutting the flat composite charge along the cut line into the first piece and the second piece separated by the edges having the angle comprises cutting the edges to have opposing 45 degree edges angled outward from the cut line.

11. The method of claim 7, wherein applying the reinforcement ply over the first piece and the second piece to hold the first piece and the second piece together comprises applying a composite fabric ply.

12. The method of claim 7, wherein applying the ply of contact material to the forming mandrel comprises applying a polyester peel ply.

13. The method of claim 7, wherein applying the vertical pressure to the first flange and the second flange of the first piece and the second piece, respectively, to form the composite blade stiffener comprises applying the vertical pressure to form a T-shaped structure with a substantially flat top.

14. The method of claim 7, further comprising:
loading a plate over the first flange and the second flange following withdrawal of the tooling plunger from the cavity of the forming mandrel; and
applying the vertical pressure to the first flange and the second flange using the plate.

15. The method of claim 7, further comprising:
applying a barely visible impact damage (BVID) treatment to the composite blade stiffener; and
curing both the composite blade stiffener and the BVID treatment during a single curing process.

16. The method of claim 7, further comprising:
heating the flat composite charge prior to activating the tooling plunger.

17. A method for forming a flat composite charge into a composite blade stiffener, comprising:
cutting the flat composite charge along a cut line into two pieces separated by edges having opposing 45 degree edges angled outward from the cut line;
positioning the flat composite charge on a forming mandrel about a tooling plunger such that the tooling plunger is aligned with the cut line;
activating the tooling plunger to drive the two pieces of the flat composite charge into a cavity of the forming mandrel resulting in the opposing 45 degree edges forming a flat surface perpendicular to the cut line and a first flange and a second flange connected to the flat surface;
withdrawing the tooling plunger from the cavity of the forming mandrel;
compressing the forming mandrel to apply a lateral pressure to the two pieces folded into the cavity;
applying a vertical pressure to the first flange and the second flange to form the composite blade stiffener;
applying a barely visible impact damage (BVID) treatment to the composite blade stiffener; and
curing both the composite blade stiffener and the BVID treatment during a single curing process.

18. The method of claim 17, further comprising:
applying a reinforcement ply over the two pieces to hold the two pieces together.

19. The method of claim 17, further comprising:
applying a ply of contact material to the forming mandrel; and
positioning the flat composite charge on the ply of contact material on the forming mandrel.

20. The method of claim 17, further comprising:
loading a plate over the first flange and the second flange following withdrawal of the tooling plunger from the cavity of the forming mandrel; and
applying the vertical pressure to the first flange and the second flange using the plate.

* * * * *